United States Patent
Huang et al.

(10) Patent No.: US 8,108,598 B2
(45) Date of Patent: Jan. 31, 2012

(54) HARD DRIVE ACCESSING METHOD AND HARD DRIVE ACCESSING SYSTEM SUPPORTING MAXIMUM TRANSMISSION RATE OF HARD DRIVE

(75) Inventors: Chung-Ching Huang, Taipei Hsien (TW); Chin-Han Chang, Taipei Hsien (TW); Jia-Hung Wang, Taipei Hsien (TW)

(73) Assignee: VIA Technologies, Inc., New Taipei (TW)

( * ) Notice: Subject to any disclaimer, the term of this patent is extended or adjusted under 35 U.S.C. 154(b) by 316 days.

(21) Appl. No.: 12/416,605

(22) Filed: Apr. 1, 2009

(65) Prior Publication Data
US 2010/0205365 A1    Aug. 12, 2010

(30) Foreign Application Priority Data
Feb. 11, 2009   (TW) ................ 98104326 A (51) Int. Cl.
    *G06F 13/00*   (2006.01)
(52) U.S. Cl. .................. 711/111; 711/100; 711/112
(58) Field of Classification Search .................. 711/112, 711/100, 111
See application file for complete search history.

(56) References Cited

U.S. PATENT DOCUMENTS

| | | | |
|---|---|---|---|
| 6,317,842 B1* | 11/2001 | Nguyen | 713/400 |
| 2003/0217204 A1* | 11/2003 | Ono | 710/33 |
| 2004/0172233 A1* | 9/2004 | Ito et al. | 703/25 |

* cited by examiner

Primary Examiner — Yong Choe
(74) Attorney, Agent, or Firm — J.C. Patents (57) ABSTRACT

A hard drive assessing method and a hard drive assessing system supporting a maximum transmission rate of a hard drive are provided, wherein the hard drive is accessed by a controller, and both the controller and the hard drive support a plurality of transmission rates. The maximum transmission rate of the hard drive is first obtained. When the controller reads data from the hard drive, the transmission rate of the controller is set to be not lower than the maximum transmission rate, and the transmission rate of the hard drive is maintained at the maximum transmission rate. When the controller writes data into the hard drive, the transmission rate of the controller is reduced to be lower than the maximum transmission rate, and the transmission rate of the hard drive is maintained at the maximum transmission rate. Thereby, the hard drive can be accessed at its maximum transmission rate.

18 Claims, 5 Drawing Sheets

HARD DRIVE ACCESSING METHOD AND HARD DRIVE ACCESSING SYSTEM SUPPORTING MAXIMUM TRANSMISSION RATE OF HARD DRIVE

CROSS-REFERENCE TO RELATED APPLICATION

This application claims the priority benefit of Taiwan application serial no. 98104326, filed on Feb. 11, 2009. The entirety of the above-mentioned patent application is hereby incorporated by reference herein and made a part of specification.

BACKGROUND OF THE INVENTION

1. Field of the Invention

The present invention generally relates to a hard drive accessing method and a hard drive accessing system, and more particularly, to a hard drive accessing method and a hard drive accessing system which support a maximum transmission rate of a hard drive.

2. Description of Related Art

Along with the development of electronics technology, different mobile devices, such as cell phones, personal digital assistants (PDAs), and notebook computers, have been developed and brought into the market. This kind of mobile devices has become very popular among consumers due to such characteristics thereof as small volume, light weight, and diversified functionality. If disposed with a high-speed processor and a large-capacity storage medium, such a mobile device can perform various functions such as camera, phone conversation, and Internet access, or even some higher-level functions such as multimedia playing, game, and navigation. In short, a mobile device can provide very convenient and diversified functions to its user.

Power supply is one of the most important issues to a mobile device. In order to reduce the power consumption of a mobile device system, the mobile device is usually switched to a central processing unit (CPU) enhanced power mode when the system thereof enters an idle state. In this CPU enhanced power mode, a phase locked loop (PLL) in the controller is turned off. The controller issues a power management event (PME) message to wake up the CPU when the hard drive issues an interrupt or a direct memory access (DMA) request. However, after the CPU is waken up, signal phase shift between the controller and the hard drive may be caused due to their hardware design, and accordingly the clock signal of the controller cannot be correctly synchronized with the clock signal of the hard drive. As a result, the hard drive can not be accessed correctly. In this case, the transmission rate of the hard drive has to be reduced to stabilize the system.

For example, the existing standard specification of an integrated drive electronics (IDE) hard drive supports 7 ultra direct memory access (UDMA) modes, and each of the UDMA modes is corresponding to a specific transmission rate (as shown in table 1), wherein the transmission rates gradually increase from mode 0 to mode 6, and the transmission rate 133 MB/s corresponding to mode 6 is the highest.

TABLE 1

| | Mode | | | | | | |
|---|---|---|---|---|---|---|---|
| | Mode 0 | Mode 1 | Mode 2 | Mode 3 | Mode 4 | Mode 5 | Mode 6 |
| Transmission rate (MB/s) | 16.7 | 25.0 | 33.3 | 44.4 | 66.7 | 100 | 133 |

Figure 1:
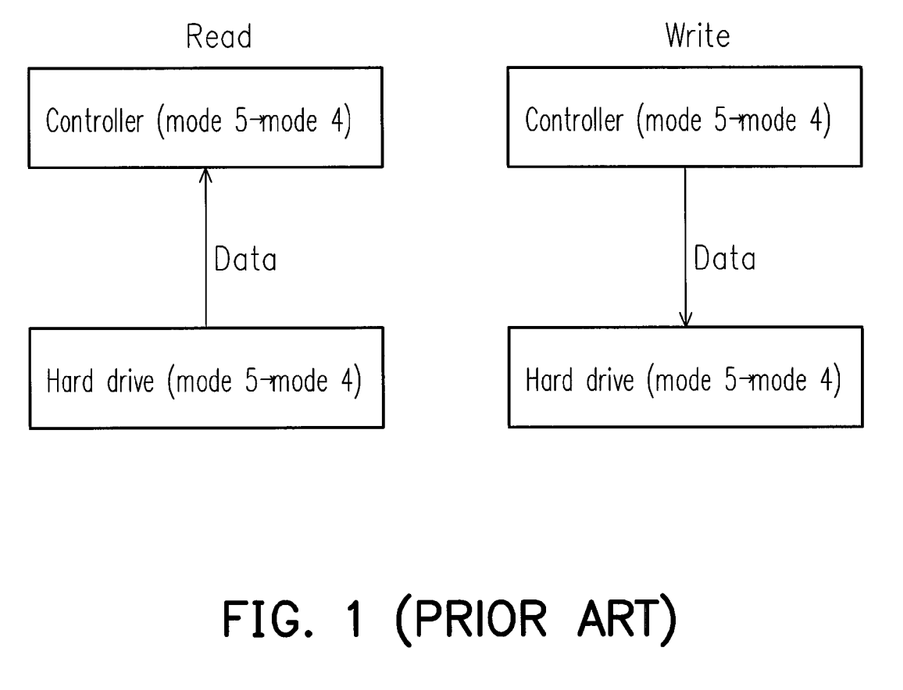
FIG. 1 is a diagram of a conventional hard drive assessing method.

FIG. 1 is a diagram of a conventional hard drive assessing method. Referring to FIG. 1, assuming the maximum transmission rate supported by an existing hard drive is the transmission rate 100 MB/s corresponding to mode 5. Signal phase shift between the controller and the hard drive may happen when the system is waken up to access the hard drive from a power saving mode of the system. Because the controller and the hard drive have to work in a synchronous access environment, when signal phase shift happens, the transmission rate of the hard drive and the controller have to be reduced (for example, from mode 5 to mode 4) to stabilize the system and write data into or read data from the hard drive. However, in the method described above, the maximum transmission rate (for example, the transmission rate 100 MB/s corresponding to mode 5) supported by the hard drive is sacrificed because of the requirement of the synchronous access environment. Namely, when the controller reads data from the hard drive, the hard drive should be able to operate at the transmission rate corresponding to mode 5 originally, but to avoid the problem of signal phase shift, the hard drive can only operate at the transmission rate corresponding to mode 4 lower than that corresponding to mode 5. As a result, the performance of the entire system is reduced.

SUMMARY OF THE INVENTION

Accordingly, the present invention is directed to a hard drive assessing method which supports a maximum transmission rate of a hard drive, wherein an asynchronous access environment is established through a software method such that the hard drive can be accessed at the maximum transmission rate thereof.

The present invention is also directed to a hard drive accessing system which supports a maximum transmission rate of a hard drive, wherein a clock signal of a controller for accessing the hard drive is appropriately adjusted so that data in the hard drive can be correctly accessed at the maximum transmission rate of the hard drive.

The present invention provides a hard drive assessing method which supports a maximum transmission rate of a hard drive, wherein data in the hard drive is accessed by using a controller, and both the controller and the hard drive support a plurality of transmission rates. In the hard drive assessing method, a maximum transmission rate of the hard drive is first obtained. When the controller reads data from the hard drive, the transmission rate of the controller is set to be not lower than the maximum transmission rate of the hard drive, and the maximum transmission rate of the hard drive is maintained.

The present invention also provides a hard drive accessing system which supports a maximum transmission rate of a hard drive. The hard drive accessing system includes the hard drive and a controller. The hard drive supports a plurality of transmission rates including a maximum transmission rate. The controller also supports foregoing all transmission rates. The controller is connected to the hard drive through a transmission interface. When the controller reads data from the hard drive, the transmission rate of the controller is set to be not lower than the maximum transmission rate of the hard drive, and the maximum transmission rate of the hard drive is maintained.

As described above, the present invention provides a hard drive assessing method and a hard drive accessing system which support a maximum transmission rate of a hard drive, wherein data in the hard drive can be read correctly at the maximum transmission rate of the hard drive, and data can be correctly written into the hard drive at a transmission rate lower than the maximum transmission rate of the hard drive. An asynchronous access environment is established through the software method described above such that the hard drive can be accessed at the maximum transmission rate thereof.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Generally speaking, when a controller (for example, a hard drive controller) accesses a hard drive, both the controller and the hard drive have to work in a synchronous access environment, namely, a clock signal of the controller has to be synchronous to a clock signal of the hard drive. Conventionally, the transmission rates of the controller and the hard drive are both reduced in order to prevent the problem of signal phase shift. In the present invention, an asynchronous access environment is established through a software method to resolve foregoing problem of signal phase shift. Herein the "asynchronous access environment" means that while reading data, the controller reads data from the hard drive at a transmission rate not lower than the maximum transmission rate of the hard drive (for example, a transmission rate same as the maximum transmission rate in the hard drive standard specification or a transmission rate same as the maximum transmission rate of the hard drive) by ignoring the value written in a mode control register controlling the transmission rate of the controller; and while writing data, the clock of the controller for accessing the hard drive is reduced to a transmission rate lower than the original transmission rate of the hard drive according to the value written in the mode control register. Accordingly, compared to the conventional method, not only the hard drive can be accessed at its original maximum transmission rate, but the problem of signal phase shift can be avoided. Embodiments of the present invention will be described below with reference to accompanying drawings.

Figure 2:
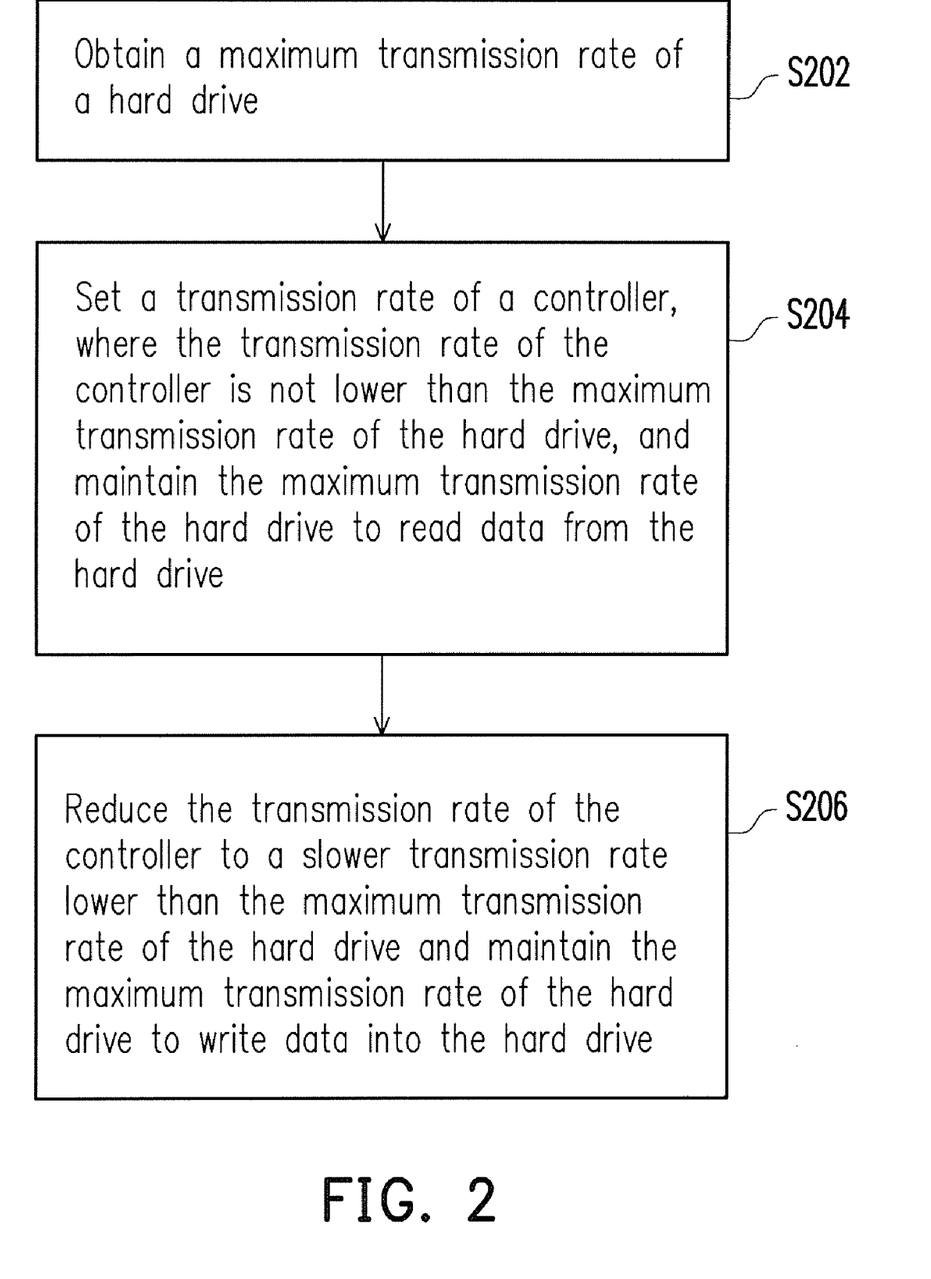
FIG. 2 is a flowchart of a hard drive assessing method supporting a maximum transmission rate of a hard drive according to an embodiment of the present invention.

FIG. 2 is a flowchart of a hard drive assessing method supporting a maximum transmission rate of a hard drive according to an embodiment of the present invention. Referring to FIG. 2, in the present embodiment, data in the hard drive is accessed by a controller, wherein both the controller and the hard drive support multiple levels of transmission rates, as shown in table 1. The controller may be disposed in a north bridge/south bridge integrated chipset or a south bridge chipset, and the hard drive may be disposed in a host (for example, a cell phone, a PDA, or a notebook computer) or connected to a host externally. The hard drive disposed in a host may be an integrated drive electronics (IDE) hard drive, while the hard drive connected to a host may be an external hard drive which can be controlled by a controller through the conversion of a transmission interface.

First, when the host is turned on, it first obtains the maximum transmission rate of the hard drive (step S202). To be specific, when the basic input/output system (BIOS) of the host executes a power-on self test (POST), the host issues an identify command to the hard drive through an input/output port (IO port) thereof to query the maximum transmission rate (for example, the transmission rate 100 MB/s corresponding to mode 5) of the hard drive. The BIOS notifies the operating system of a response to the maximum transmission rate of the hard drive by broadcasting an advanced configuration & power interface source language (ASL) code. In particular, conventionally, the system notifies the operating system of a value written in the mode control register, and accordingly the operating system controls the transmission rate of the hard drive according to the value. However, in the present invention, it is the BIOS which queries the maximum transmission rate of the hard drive and notifies the operating system of a response to the maximum transmission rate of the hard drive, and accordingly the operating system controls the transmission rate of the hard drive through the response.

According to the present invention, in the case that signal phase shift between the controller and the hard drive may occur, when the controller reads the hard drive, the control of the value written in the mode control register over the transmission rate of the controller can be ignored based on the hardware design of the controller; instead, data in the hard drive is read at a transmission rate not lower than the maximum transmission rate of the hard drive. In other words, in the present invention, the controller can read data from the hard drive at the maximum transmission rate in the hard drive transmission rate standard specification (for example, the transmission rate 133 MB/s corresponding to ultra direct memory access (UDMA) mode 6) or a transmission rate same as the maximum transmission rate of the hard drive (for example, the transmission rate 133 MB/s corresponding to mode 5). Herein, the transmission rate of the hard drive can be maintained at the transmission rate that the BIOS notifies the operating system of, namely, the maximum transmission rate of the hard drive (step S204).

To be specific, the hardware design of the controller allows it to support various transmission rates in the hard drive transmission rate standard. In addition, regarding the controller and the hard drive in the present invention, the controller having a higher clock rate (transmission rate) can tolerate the device having a lower clock rate and can read signals from the device having the lower clock rate. Accordingly, when the controller reads the hard drive, the controller can read data from the hard drive at the maximum transmission rate (for example, the transmission rate corresponding to mode 6) in the hard drive transmission rate standard or at a transmission rate same as the maximum transmission rate of the hard drive (for example, the transmission rate corresponding to mode 5). As to the hard drive, the transmission rate thereof is still maintained at the transmission rate that the BIOS notifies the operating system of, namely, the maximum transmission rate of the hard drive (for example, the transmission rate corresponding to mode 5). Based on the characteristic described above, the controller and the hard drive will not conflict with each other. Accordingly, in the present invention, the controller can read data from a hard drive having a lower transmission rate without producing any signal phase shift problem, and the transmission rate of the hard drive can be maintained at the maximum transmission rate thereof.

On the other hand, when the controller writes data into the hard drive, the transmission rate of the controller is reduced to a transmission rate lower than the maximum transmission rate of the hard drive, and meanwhile, the transmission rate of the hard drive is maintained at the maximum transmission rate thereof (step S206). To be specific, to ensure that the hard drive can read the data written by the controller, in the present embodiment, the transmission rate of the controller is reduced to a transmission rate lower than the maximum transmission rate of the hard drive for one or more levels (for example, reduced to the transmission rate corresponding to mode 4 from mode 6). Besides, also based on the characteristic of the present invention that a controller having a higher clock rate can read signals from a device having a lower clock rate, the problem of signal phase shift is avoided when the hard drive reads the data written by the controller, and the transmission rate of the hard drive can be maintained at the transmission rate that the BIOS notifies the operating system of, namely, the maximum transmission rate of the hard drive (for example, the transmission rate corresponding to mode 5).

Incorrect hard drive access caused by signal phase shift between the controller and the hard drive can be prevented through the hard drive assessing method described above. It has to be noted that the problem of signal phase shift usually happens when the processor is waken up after the system enters a power saving mode and the processor is about to access the hard drive. Regarding to this situation, a method for correctly accessing data in the hard drive is provided by the present invention, and below, this method will be described in detail with reference to another embodiment of the present invention.

Figure 3:
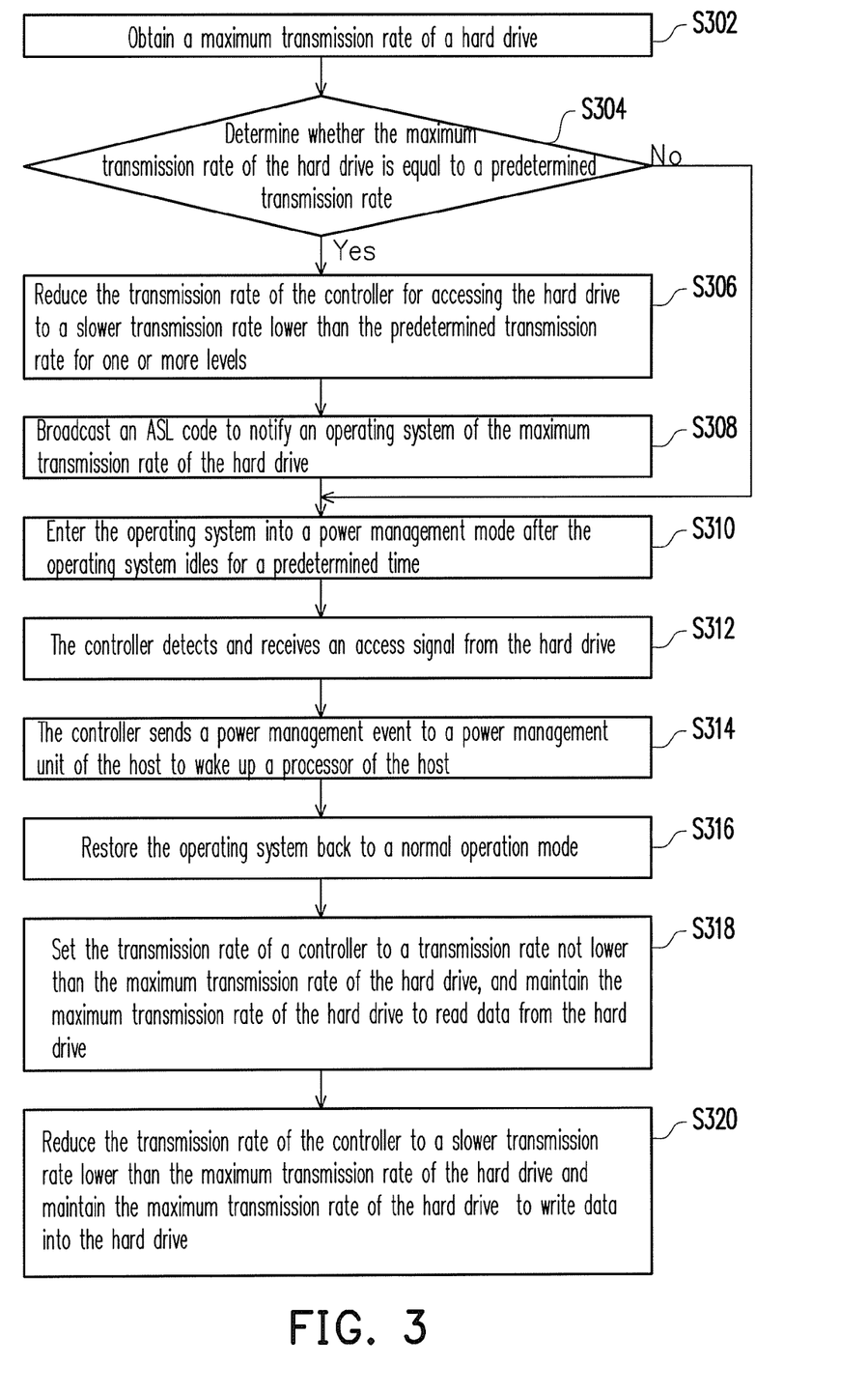
FIG. 3 is a flowchart of a hard drive assessing method supporting a maximum transmission rate of a hard drive according to an embodiment of the present invention.

FIG. 3 is a flowchart of a hard drive assessing method supporting a maximum transmission rate of a hard drive according to an embodiment of the present invention. Referring to FIG. 3, in the present embodiment, the system works in a power management mode (for example, a central processing unit (CPU) enhanced power mode), and the controller (for example, a hard drive controller) can still read data from the hard drive correctly even when the hard drive is maintained at its maximum transmission rate. The controller may be disposed in a north bridge/south bridge integrated chipset or a south bridge chipset, and the hard drive may be disposed in a host (for example, a cell phone, a PDA, or a notebook computer) or connected to a host externally. The hard drive disposed in a host may be an IDE hard drive, while the hard drive connected externally to a host may be an external hard drive which can be controlled by a controller through the conversion of a transmission interface.

First, when a BIOS of the host executes a POST, the host issues an identify command to the hard drive through an IO port thereof to obtain the maximum transmission rate of the hard drive (step S302).

It should be noted that in order to avoid signal phase shift when the system enters or leaves a power management mode, in the present embodiment, the transmission rate which may produce access error to the system is restricted. To be specific, when the host obtains the maximum transmission rate of the hard drive, the system compares the maximum transmission rate of the hard drive with a predetermined transmission rate to determine whether the maximum transmission rate of the hard drive is equal to the predetermined transmission rate (step S304), wherein the predetermined transmission rate is the transmission rate which is pre-tested and determined to be a transmission rate which may cause system access error.

If the maximum transmission rate of the hard drive is equal to the predetermined transmission rate, the transmission rate of the controller is then reduced by the BIOS to a slower transmission rate lower than the predetermined transmission rate for one or more levels (step S306), and a value corresponding to the slower transmission rate is filled into a mode control register corresponding to the controller. In order to ensure that the hard drive is maintained at the maximum transmission rate thereof, the BIOS broadcasts an ASL code regarding the maximum transmission rate of the hard drive to notify the operating system that the hard drive can still support the maximum transmission rate (step S308).

If the maximum transmission rate of the hard drive is not equal to the predetermined transmission rate, or a value corresponding to a transmission rate which is lower than the predetermined transmission rate for one or more levels has been filled into the mode control register, the problem of asynchronous transmission rates will not happen. In this case, when the operating system idles for more than a predetermined time, it enters a power management mode (step S310) and waits for a next event to execute a next action. When the operating system enters the power management mode, it may turn off a phase locked loop (PLL) in the controller to reduce the power consumption.

However, when the operating system is entering the power management mode, the controller still detects and receives an access signal from the hard drive (step S312). The access signal may be an interrupt signal or a direct memory access (DMA) request. Once the controller receives the access signal, it issues a power management event (PME) to a power management unit of the host to wake up a processor of the host (step S314) and restores the operating system back into the normal operation mode (step S316).

It should be mentioned that after the processor is waken up, if the maximum transmission rate of the hard drive is equal to the predetermined transmission rate and the controller is about to read the hard drive, the control of the value written in the mode control register over the transmission rate of the controller is ignored, and the controller reads data in the hard drive at a transmission rate not lower than the maximum transmission rate of the hard drive. In other words, in the present invention, the controller can read data from the hard drive at the maximum transmission rate in the hard drive transmission rate standard (i.e., the transmission rate 133 MB/s corresponding to mode 6) or a transmission rate same as the maximum transmission rate of the hard drive (for example, the transmission rate 133 MB/s corresponding to mode 5). In this case, the transmission rate of the hard drive can still be maintained at the maximum transmission rate that the BIOS notifies the operating system of, namely, the maximum transmission rate of the hard drive (step S318).

On the other hand, when the controller writes data into the hard drive, the transmission rate of the controller is reduced to a slower transmission rate lower than the maximum transmission rate of the hard drive for one or more levels, and meanwhile, the maximum transmission rate of the hard drive is maintained (step S320).

Figure 4:
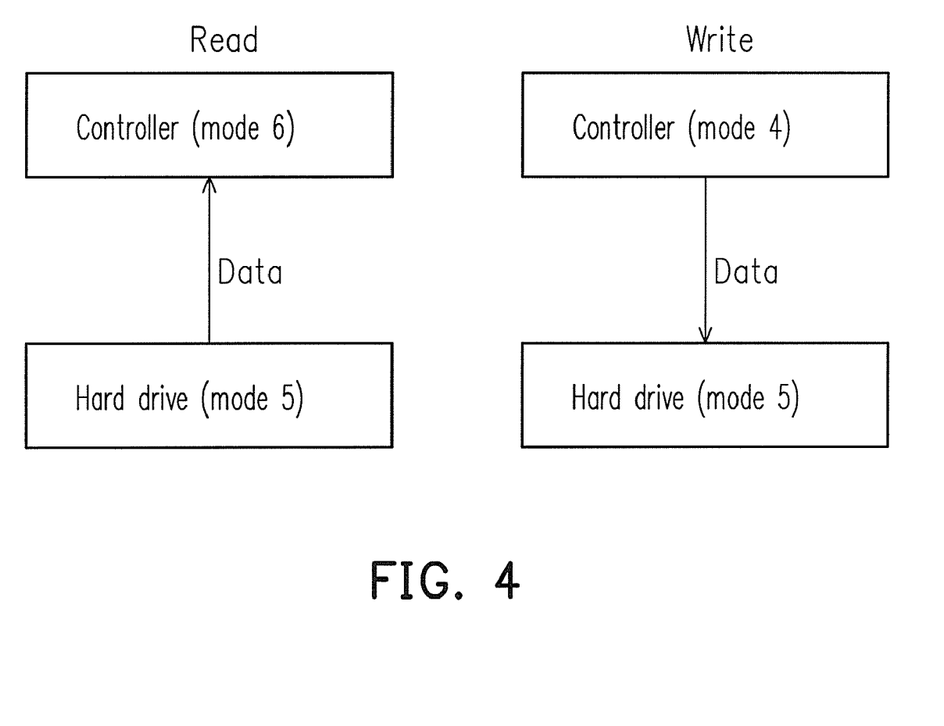
FIG. 4 illustrates an example of a hard drive assessing method supporting a maximum transmission rate of a hard drive according to an embodiment of the present invention.

FIG. 4 illustrates an example of a hard drive assessing method supporting a maximum transmission rate of a hard drive according to an embodiment of the present invention. Referring to FIG. 4, in the present embodiment, it is assumed that the maximum transmission rate of an existing hard drive is the transmission rate 100 MB/s corresponding to mode 5, and the transmission rate that may cause system access error is also this transmission rate 100 MB/s corresponding to mode 5. In addition, it is further assumed that the predetermined transmission rate which allows the system to enter the power saving mode is the transmission rate 66.7 MB/s corresponding to mode 4. Based on foregoing assumptions, when the system obtains the maximum transmission rate of the hard drive (i.e., the transmission rate corresponding to mode 5), the system determines whether this transmission rate is the transmission rate which causes system access error, and since the maximum transmission rate of the hard drive is exactly the transmission rate for causing system access error, the a value corresponding to mode 4 is written into the mode control register corresponding to the controller through the BIOS, so as to meet the condition for entering the system into the power saving mode and avoid the mode in which system access error may be produced. Meanwhile, the BIOS broadcasts an ASL code to notify the operating system that the hard drive can still support mode 5, so that the conventional method for controlling the transmission rate of the hard drive with the value in the mode control register can be replaced. Accordingly, the system can enter the power saving mode (i.e., mode 4) when the transmission rate of the hard drive is maintained in mode 5.

It should be noted that if the processor is to be waken up again to read the hard drive when the system is in the power saving mode, to avoid the possible signal phase shift (if the maximum transmission rate of the hard drive is equal to the predetermined transmission rate), the control of the value written in the mode control register over the transmission rate of the controller can be ignored based on the characteristic of the controller design in the present invention. Accordingly, the controller reads data in the hard drive at the maximum transmission rate in the hard drive transmission rate standard (for example, the transmission rate corresponding to mode 6) or a transmission rate same as the maximum transmission rate of the hard drive (for example, the transmission rate corresponding to mode 5 not shown in FIG. 4). On the other hand, because the BIOS already notifies the operating system that the hard drive can still support the maximum transmission rate thereof, the transmission rate of the hard drive is still maintained at the transmission rate 100 MB/s of mode 5. After that, the controller reads data from the hard drive. Thereby, the data in the hard drive can be read correctly and the stability of system can be maintained when the hard drive is maintained at its maximum transmission rate.

On the other hand, if the processor is to be waken up again to write data into the hard drive by using the controller when the system is in the power saving mode, to avoid possible signal phase shift (if the maximum transmission rate of the hard drive is equal to the predetermined transmission rate), the system reads the value in the mode control register of the controller. Because a value corresponding to a transmission rate lower than the predetermined transmission rate for one or more levels has been filled into the mode control register, the transmission rate of the controller is correspondingly reduced to the transmission rate 66.7 MB/s of mode 4. Besides, because the BIOS already notifies the operating system that the hard drive can still support the maximum transmission rate thereof, the transmission rate of the hard drive is still maintained at the transmission rate 100 MB/s of mode 5. Thereafter, the controller writes data into the hard drive. Thereby, the data can be written into the hard drive correctly and the stability of the system can be maintained when the transmission rate of the hard drive is maintained at its maximum transmission rate.

Through the hard drive assessing method described above, even though the operating system is restored from the power management mode back to the normal operation mode, the problem of signal phase shift between the controller and the hard drive can still be avoided by appropriately adjusting the transmission rate of the controller, and accordingly the stability of the system can be improved.

It should be mentioned that a corresponding system structure corresponding to foregoing hard drive assessing method is also provided by the present invention, wherein through the communication and coordination between a controller (for example, a hard drive controller) and a hard drive, a transmission rate parameter recorded in a mode control register is appropriately adjusted, and the data in the hard drive is accessed according to this transmission rate parameter. This system will be described below with reference to another embodiment of the present invention.

Figure 5:
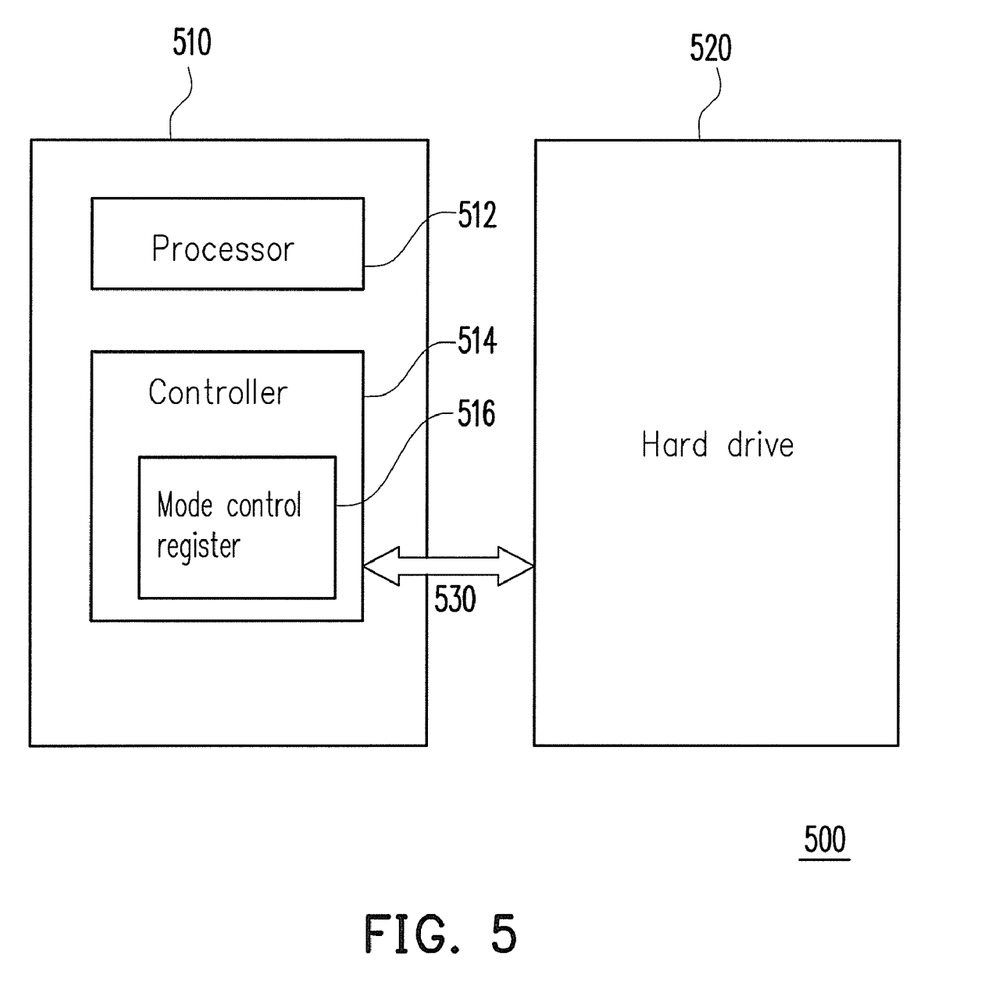
FIG. 5 is a block diagram of a hard drive accessing system supporting a maximum transmission rate of a hard drive according to an embodiment of the present invention.

FIG. 5 is a block diagram of a hard drive accessing system supporting a maximum transmission rate of a hard drive according to an embodiment of the present invention. Referring to FIG. 5, in the present embodiment, the hard drive accessing system 500 includes a host 510, a hard drive 520, and a transmission interface 530. The host 510 may be a mobile device, such as a cell phone, a PDA, or a notebook computer. The hard drive 520 may be an IDE hard drive or an external hard drive. The transmission interface 530 may be an IDE interface or a transmission conversion interface which allows the external hard drive to be controlled by a controller 514 in the host 510. In an embodiment of the present invention, the hard drive 520 and the transmission interface 530 are disposed in the host 510; however, the disposition of the hard drive 520 and the transmission interface 530 is not limited in the present embodiment. Below, the functions of foregoing elements will be respectively described in detail.

The host 510 supports, for example, all the transmission rates shown in table 1, and the hard drive 520 supports some of these transmission rates including a maximum transmission rate.

The host 510 includes a processor 512 and the controller 514, and the controller 514 includes a mode control register 516. The controller 514 (for example, a hard drive controller) is connected to the hard drive 520 through the transmission interface 530 to obtain the maximum transmission rate of the hard drive 520. To be specific, when the BIOS of the host 510 executes a POST, the host 510 issues an identify command through an IO port thereof and sends the identify command to the hard drive 520 through the transmission interface 530 to query the maximum transmission rate of the hard drive 520.

After the maximum transmission rate of the hard drive is obtained, the system 500 determines whether this maximum transmission rate is higher than a predetermined transmission rate. If the maximum transmission rate of the hard drive is equal to the predetermined transmission rate, the transmission rate of the controller is then reduced by the BIOS to a slower transmission rate lower than the predetermined transmission rate for one or more levels, and a value corresponding to the slower transmission rate is filled into a mode control register 516 corresponding to the controller After that, the BIOS of the system 500 broadcasts an ASL code to notify the operating system of the system 500 about the maximum transmission rate of the hard drive.

In order to avoid signal phase shift between the controller 514 and the hard drive 520, when the controller 514 reads data from the hard drive 520, the control of the value written in the mode control register 516 over the transmission rate of the controller 514 is ignored, and instead, the controller 514 reads the hard drive at a transmission rate not lower than the maximum transmission rate of the hard drive. Namely, in the present invention, the controller 514 reads data from the hard drive 520 at the maximum transmission rate in the hard drive transmission rate standard or a transmission rate same as the maximum transmission rate of the hard drive 520. In this case, the transmission rate of the hard drive 520 can be maintained at that the BIOS notifies the operating system of, namely, the maximum transmission rate of the hard drive 520.

On the other hand, when the controller 514 writes data into the hard drive 520, the transmission rate of the controller 514 is reduced to a slower transmission rate lower than the maximum transmission rate of the hard drive for one or more levels, and meanwhile, the transmission rate of the hard drive 520 is maintained at the maximum transmission rate thereof.

Foregoing hard drive accessing system can be applied to all mobile devices so that the problem of signal phase shift can be avoided through a software method without sacrificing the access performance of the hard drive. Particularly, the number of times of reading data from a hard drive is much greater than the number of times of writing data into the hard drive. Thus, in the present invention, the control of the value in the mode control register over the controller is ignored, so that when the controller reads data from the hard drive, the transmission rate of the hard drive can be maintained at its maximum transmission rate. Besides, the hard drive accessing system supports signal synchronization in both the CPU enhanced power mode and the power management mode, and the detailed operation flow thereof can be referred to foregoing embodiments and will not be described herein.

As described above, the present invention provides a hard drive assessing method and a hard drive accessing system which support a maximum transmission rate of a hard drive, wherein the transmission rate of the controller is appropriately adjusted while the hard drive is maintained at its maximum transmission rate, so that data in the hard drive can be accessed at the maximum transmission rate of the hard drive even when the mobile device is restored from a power saving mode, and accordingly the stability of the system is ensured. Moreover, in the present invention, an asynchronous access environment is established through a software method such that the restriction in hardware structure of the mobile device can be overcome, and the cost for altering the hardware structure of the mobile device can be saved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A hard drive assessing method supporting a maximum transmission rate of a hard drive, suitable for accessing data in the hard drive by using a controller, wherein both the controller and the hard drive support a plurality of transmission rates, the hard drive assessing method comprising:

obtaining the maximum transmission rate of the hard drive;

setting a transmission rate of the controller, wherein the transmission rate of the controller is higher than the maximum transmission rate and the maximum transmission rate of the hard drive is maintained to read the data in the hard drive; and reducing the transmission rate of the controller to a slower transmission rate lower than the maximum transmission rate and maintaining the maximum transmission rate of the hard drive to write data into the hard drive.

2. The hard drive assessing method according to claim 1, wherein the step of obtaining the maximum transmission rate of the hard drive comprises:

issuing an identify command to the hard drive to query the maximum transmission rate of the hard drive when a host is turned on.

3. The hard drive assessing method according to claim 1, wherein after the step of obtaining the maximum transmission rate of the hard drive, the hard drive accessing method further comprises:

determining whether the maximum transmission rate is equal to a predetermined transmission rate; and if the maximum transmission rate is equal to the predetermined transmission rate, filling a value corresponding to a slower transmission rate lower than the predetermined transmission rate into a mode control register of the controller, and broadcasting an advanced configuration & power interface source language (ASL) code to notify an operating system of the maximum transmission rate of the hard drive.

4. The hard drive assessing method according to claim 3, wherein after the step of filling the value corresponding to a slower transmission rate lower than the predetermined transmission rate and broadcasting the ASL code, the hard drive assessing method further comprises:

the operating system entering a power management mode;

receiving an access signal issued by the hard drive by using the controller;

issuing a power management event (PME) to a power management unit for waking up a processor by using the controller; and restoring the operating system back into a normal operation mode.

5. The hard drive assessing method according to claim 3, wherein the value filled into the mode control register for controlling the controller originally is ignored when the controller reads the data in the hard drive.

6. The hard drive assessing method according to claim 1, wherein the step of maintaining the maximum transmission rate of the hard drive to read the data in the hard drive comprises:

notifying an operating system of the maximum transmission rate of the hard drive.

7. The hard drive assessing method according to claim 1, wherein the step of reducing the transmission rate of the controller to the slower transmission rate lower than the maximum transmission rate and maintaining the maximum transmission rate of the hard drive to write the data into the hard drive comprises:

reducing the transmission rate of the controller to the slower transmission rate which is one level lower than the maximum transmission rate, wherein both the controller and the hard drive support multiple levels of transmission rates.

8. The hard drive assessing method according to claim 1, wherein the step of reducing the transmission rate of the controller to the transmission rate lower than the maximum transmission rate to write the data into the hard drive comprises:

the controller being controlled by a value filled into a mode control register.

9. The hard drive assessing method according to claim 1, wherein the step of maintaining the maximum transmission rate of the hard drive to write the data into the hard drive comprises:

notifying an operating system of the maximum transmission rate of the hard drive, such that an asynchronous access environment is established.

10. A hard drive accessing system supporting a maximum transmission rate of a hard drive, comprising:

the hard drive, supporting a plurality of transmission rates comprising a maximum transmission rate; and a controller, supporting the transmission rates, connected to the hard drive through a transmission interface, wherein a transmission rate of the controller higher than the maximum transmission rate of the hard drive is set and the maximum transmission rate of the hard drive is maintained to read data in the hard drive through the controller, and the transmission rate of the controller is reduced to a slower transmission rate lower than the maximum transmission rate and the maximum rate of the hard drive is maintained to write data into the hard drive through the controller, such that an asynchronous access environment is established.

11. The hard drive accessing system according to claim 10, wherein when a host is turned on, the host issues an identify command to the hard drive through the controller to query the maximum transmission rate of the hard drive.

12. The hard drive accessing system according to claim 10 further comprising a mode control register, wherein the hard drive accessing system further determines whether the maximum transmission rate is equal to a predetermined transmission rate, and if the maximum transmission rate is equal to the predetermined transmission rate, the hard drive accessing system fills a value corresponding to a slower transmission rate lower than the predetermined transmission rate into the mode control register and broadcasts an advanced configuration & power interface source language (ASL) code to notify an operating system of the maximum transmission rate of the hard drive.

13. The hard drive accessing system according to claim 10 further comprising a processor and a power management unit, wherein after an operating system enters a power management mode, the controller further receives an access signal from the hard drive and sends a power management event (PME) to the power management unit to wake up the processor and restore the operating system back to a normal operation mode.

14. The hard drive accessing system according to claim 10, wherein when the transmission rate of the controller higher than the maximum transmission rate of the hard drive is set to read the data in the hard drive, the controller is not controlled by a value filled into a mode control register.

15. The hard drive accessing system according to claim 10, wherein when the maximum transmission rate of the hard drive is maintained to read the data in the hard drive, an operating system is notified of the maximum transmission rate of the hard drive.

16. The hard drive accessing system according to claim 10, wherein when the transmission rate of the controller is reduced to the slower transmission rate lower than the maximum transmission rate to write the data into the hard drive, the controller is controlled by a value filled into a mode control register.

17. The hard drive accessing system according to claim 10, wherein the transmission rate of the controller is reduced to the slower transmission rate which is one level lower than the maximum transmission rate, and both the controller and the hard drive support multiple levels of transmission rates.

18. The hard drive accessing system according to claim 10, wherein when the maximum transmission rate of the hard drive is maintained to read the data from the hard drive, an operating system is notified of the maximum transmission rate of the hard drive.

* * * * *